No. 859,762. PATENTED JULY 9, 1907.
T. W. GREEN.
ROTARY BLOWER OR EXHAUSTER.
APPLICATION FILED JAN. 23, 1907.

2 SHEETS—SHEET 1.

WITNESSES:
A. F. Flanagan.
J. V. Bosworth

INVENTOR
Thomas W. Green
BY
Thomas Mowly
ATTORNEY.

UNITED STATES PATENT OFFICE.

THOMAS W. GREEN, OF PHILADELPHIA, PENNSYLVANIA, ASSIGNOR TO WILBRAHAM-GREEN BLOWER COMPANY, OF PHILADELPHIA, PENNSYLVANIA, A CORPORATION OF PENNSYLVANIA.

ROTARY BLOWER OR EXHAUSTER.

No. 859,762.  Specification of Letters-Patent.  Patented July 9, 1907.

Application filed January 23, 1907. Serial No. 353,606.

*To all whom it may concern:*

Be it known that I, THOMAS W. GREEN, a citizen of the United States, residing at Philadelphia, in the county of Philadelphia and State of Pennsylvania, have invented certain new and useful Improvements in Rotary Blowers or Exhausters, of which the following is a specification.

My invention relates to rotary blowers or exhausters and the object of my improvement is to release and pass forward to the discharge opening, the small amount of compressed air caught or pocketed between the waist or middle portion of one impeller and the outer end or wing of the opposite impeller. In the ordinary form of blower the air thus caught between the two impellers is released by the forward movement of the impellers and is projected against the incoming current, making a slight thumping noise on each half revolution of the impellers and retarding the incoming current. The volume of compressed air released on each half revolution of the impellers is quite small but the impellers revolve very rapidly, consequently the aggregate amount saved by the use of my improvement in the course of a day's operation is very considerable, both in the volume of air discharged and the power required to operate the blower.

Figure 1:
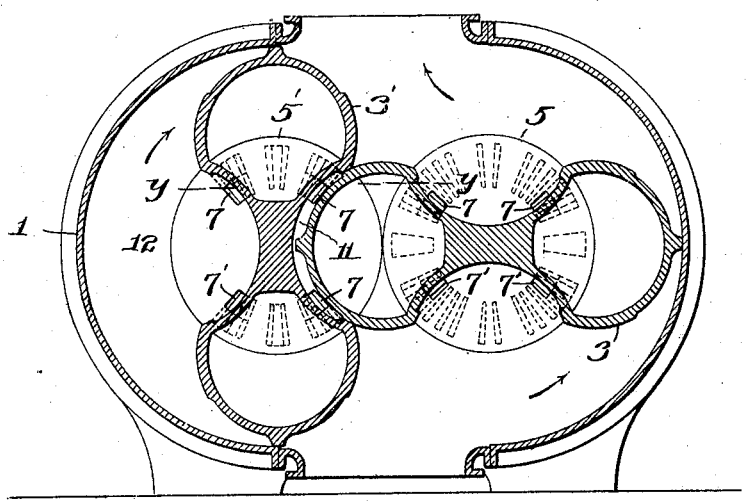
Figure 2:
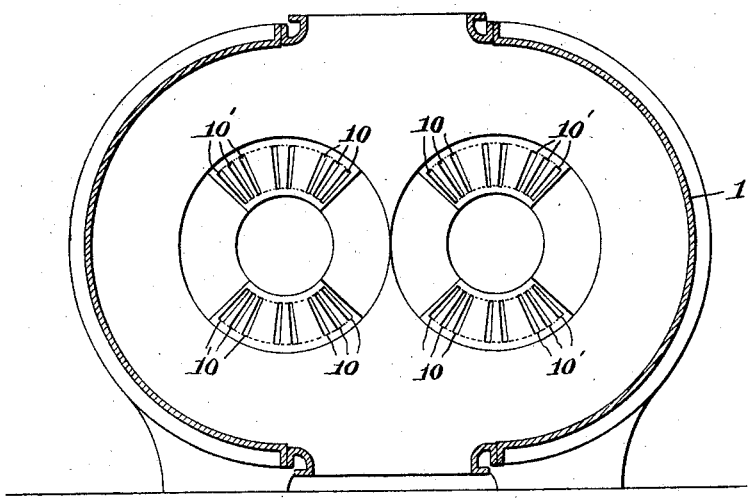

In the accompanying drawing, Figure 1, is a transverse vertical section through a blower containing my improvement, as on line X. X. of Fig. 3. Fig. 2, is a similar view showing the impellers removed. Fig. 3, is a plan view partly in section. Fig. 4, is an enlarged sectional detail, as on line Y. Y. of Fig. 1. Fig. 5, is an end view of one of the impellers removed from the casing.

Referring to the drawing by numerals, 1, indicates the casing inclosing the impellers. 2, 2, the two end casings in which the impeller shafts are journaled.

3, 3′, are the two impellers.

4, 4′, are the shafts carrying the impellers, and having thereon gear wheels of the usual type; one of these shafts is provided with a driving pulley and connected by a belt to a source of power.

5, 5′, are the circular heads formed on both ends of each of the impellers.

6, 6′, are sectional extensions or enlargements formed on the outside of the circular heads, there are two of these extensions on each of the heads and they are placed exactly opposite to each other.

7, 7′, are the ports formed in the waist portion of each impeller, there are four of these ports in each head and they extend from the inside of the circular heads into the chambers 8, 8′, formed in the extensions 6, 6′.

9, 9′, are long narrow radially extending ports formed on the outer portions of the circular heads 5, 5′. 10, 10′, are the long narrow radially extending ports formed on the inside of said casings 2. The ports 9, 9′, in the impellers are positioned so that they will at regular intervals, register with the ports 10, 10′, in the end casings as the impellers revolve; they are formed in groups of three and are made long and narrow so that they will open and close quickly. If desired the number may be increased or diminished but there must always be a sufficient number in each group to allow the air to pass through quickly.

The several parts of the blower being constructed as described and the impellers in the position shown in Figs. 1 and 3, the operation is as follows. The compressed air contained in the space marked 11, will pass through the open port 7, into the chamber 8, out of the ports 9, and through the ports 10, in the direction indicated by the arrows out of ports 10′ and 9′ through the chamber 8′ and port 7′, into the space marked 12, in the casing. The air in the space 11, being under pressure considerably above the atmosphere and the air in the space 12 being at atmospheric pressure only, when the ports 9 and 10 register the air under pressure will quickly pass out of the space 11, into space 12, and commingle with the air contained therein and be discharged with it at the outlet of the blower.

The operation described takes place twice on each revolution of the impellers and goes on simultaneously at both ends of said impellers.

The several parts of the blower not herein described are constructed in the usual and ordinary manner.

Having thus described my invention what I claim is new is,

1. A rotary blower having in combination therewith a pair of rotary impellers having ports therein, and channels in the end of the casing of said blower adapted to register with said ports and establish, at regular intervals, communication between the opposite sides of the impellers, whereby air compressed between said impellers will pass from one side of an impeller to the opposite side thereof.

2. In a rotary blower, the combination with two co-acting impellers, and ports in said impellers, of ports in the end casing of the blower adapted to register with the ports in said impellers, when the two impellers are at right angles to each other, and form a continuous passage way from the space inclosed between one side of the waist portion of one impeller and the wing of the opposite impeller and the inside of the casing.

3. In a rotary blower, the combination with two co-acting impellers having ports in both sides of the waist portion of each impeller, of ports in the end of the casing adapted to register at regular intervals with the ports of the impellers as said impellers revolve, whereby a continuous passage way from one side of the impeller to the opposite side thereof is established, for the purpose set forth.

4. In a rotary blower, the combination with a channel located in the end wall of the casing, and a port at each end of said channel, of an impeller having corresponding ports adapted during the rotation thereof to register with the ports of said channel, whereby air compressed in the waist of one impeller will be passed into the outgoing air on the opposite side of said impeller.

5. In a rotary blower, the combination with channels located in the opposite ends of the blower casing, and a port or ports at each end of each of said channels, of a pair of co-acting impellers having in each end thereof ports corresponding with the ports in the ends of the casing and adapted during the revolution of said impellers to register with the ports of said channels, whereby any air compressed in the waist portion of either impeller will pass into the outgoing air on the opposite side of said impeller.

6. In a rotary blower, the combination with the casing having in the ends thereof channels, and a port at each end of each of said channels, of an impeller having in its head a chamber, a channel connecting said chamber with the interior of the casing, and ports in said chamber adapted to register with the ports in the channels in the ends of the casing, whereby air is passed from one side of an impeller to the opposite side thereof.

7. In a rotary blower, the combination with the casing having in the end wall thereof two sets of channels, and a port or ports at each end of each of said channels, of a set of impellers, each impeller having in one of its heads two chambers, a channel connecting each of said chambers with the interior of the casing, a port or ports in each of said chambers adapted to register with the port or ports of the channels in the said end wall of the casing to permit the passage of air entrapped by the co-acting impellers to be passed to the opposite side of one of said impellers into the interior of the casing.

In testimony whereof I affix my signature in presence of two witnesses.

THOMAS W. GREEN.

Witnesses:
 THOS. D. MOWLDS,
 ANNA G. FLANAGAN.